E. H. ELDER.
LOOSE LEAF BINDER.
APPLICATION FILED FEB. 8, 1915.
1,165,767.
Patented Dec. 28, 1915.
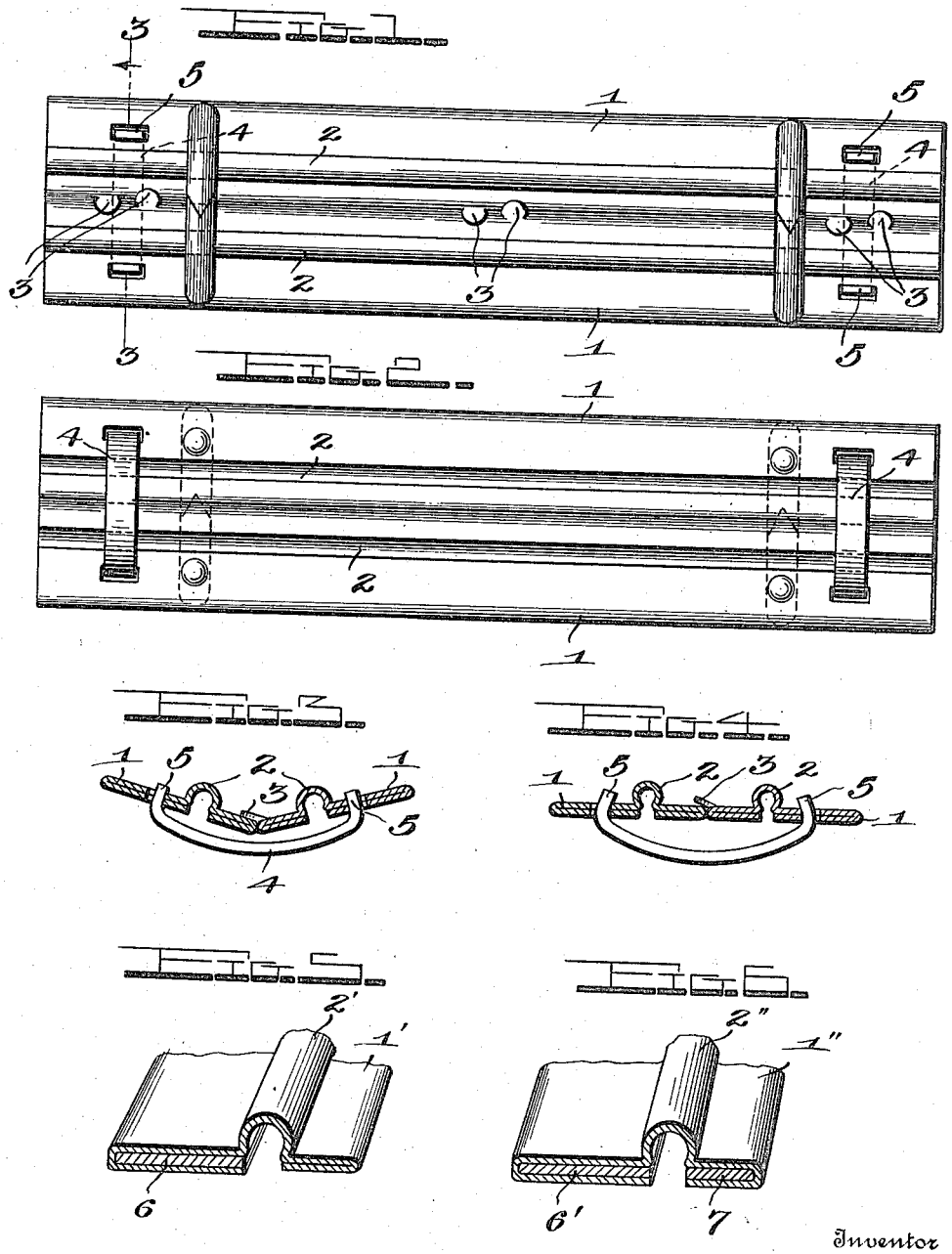

UNITED STATES PATENT OFFICE.

EDWARD H. ELDER, OF CHICOPEE FALLS, MASSACHUSETTS, ASSIGNOR TO NATIONAL BLANK BOOK COMPANY, OF HOLYOKE, MASSACHUSETTS, A VOLUNTARY TRUST ASSOCIATION OF COPARTNERSHIP HAVING AS TRUSTEES J. W. TOWNE, F. B. TOWNE, E. S. TOWNE, J. M. TOWNE, AND F. W. WILSON.

LOOSE-LEAF BINDER.

1,165,767.      Specification of Letters Patent.      Patented Dec. 28, 1915.

Application filed February 8, 1915. Serial No. 6,759.

*To all whom it may concern:*

Be it known that I, EDWARD H. ELDER, a citizen of the United States, residing at the city of Chicopee Falls, county of Hampden, State of Massachusetts, have invented certain new and useful Improvements in Loose-Leaf Binders; and I do declare the following to be a full, clear, and exact description of the invention, such as will enable others skilled in the art to which it appertains to make and use the same.

This invention relates to certain new and useful improvements in loose leaf binders, and pertains more particularly to binders of the ring type.

The primary object of the invention is to provide a binder in which the spring, or tensioning means, is incorporated in the two leaves themselves, as integral parts of the latter, and to employ clasps which are completely rigid and devoid of any spring properties.

More specifically, and as at present practised, the invention includes rigid clasps which connect the two hingedly related leaves and concavo-convex spring ribs or portions possessed of spring properties and extending longitudinally of the leaves and disposed between the clasp ends, so that the leaves will be held in their two positions, *i. e.*, open and closed positions of the prongs, by virtue of the spring portions.

In the drawings: Figure 1, is a top plan view of the invention; Fig. 2, is a bottom plan view; Fig. 3, is a section on the line 3—3 of Fig. 1; Fig. 4, is a similar view, but showing the two leaves in the same horizontal plane to illustrate the spring portions when tensioned at a maximum. Figs. 5 and 6 are fragmentary perspective views, in section of modified forms of the leaves.

The two leaves 1, are preferably formed in the manner shown in Figs. 3 and 4, in which the sides of the leaves are doubled under beyond the concavo-convex spring portions 2, the latter extending longitudinally and preferably throughout the entire lengths of the leaves. The leaves are thus strengthened and reinforced and are formed with lips 3 that provide hinge connections between the same.

Clasps 4 that are completely rigid are employed to connect the leaves, the clasps having right angular ends 5 which project through openings provided for their reception in the leaves 1, the openings being disposed beyond the outer sides of the spring portions 2. As just stated the clasps are rigid and may be formed of any desired proportion in order to obtain absolute rigidity.

When the leaves are in completely open or completely closed position, the springs or spring portions are under a minimum tension sufficient to maintain such open or closed positions, but in the movements of the leaves from open to closed position, or vice-versa, the spring portions are under increased tension. Accordingly in Fig. 4, the spring portions are depicted as being compressed as compared with Fig. 3 in which the leaves are in prong-closed position, Fig. 4 showing the leaves at dead center as in passing to or from open or closed position. It will be noted that the outline of the clasps remains the same, because they are absolutely rigid. Fig. 4 is somewhat exaggerated for the purpose of illustrating the maximum compression of the springs.

By having the spring portions extending throughout the lengths of the leaves, greater resiliency is obtained, though obviously the spring portions need not be of the length shown.

It would not answer the purposes of my invention to make the spring element 2 and its leaf member 1 of the same thickness, because if the latter were great enough to provide sufficient strength and rigidity to the leaf member 1 the spring element 2 would be too thick, and therefore I form the leaf members 1 on opposite sides of the spring member 2 of increased thickness and this may be brought about by making the spring member of one thickness of the metal and doubling the latter on itself to increase the thickness and strength of the leaf member 1, as shown at Figs. 3 and 4, or, referring to Fig. 5, a modified form of leaf 1' may be constructed having its spring portion 2' of a single thickness of metal, while a reinforcing separate strip of metal 6 may be utilized at the outer side of the leaf, or, referring to Fig. 6, a modified form of my improvement may be constructed by forming a leaf portion 1″ with the spring portion 2″ of a single thickness of metal, and with the leaf reinforced on opposite sides of the portion 2 by separate plates 6′ and 7. These reinforcements shown at Figs. 5 and 6 are secured by bending the leaves thereabout as shown.

What is claimed is:

1. In a device of the character described, a pair of hinged prong-carrying leaves each of which is formed with an integral compressible longitudinal concavo-convex and comparatively thin spring part located between the side edges of a comparatively thick leaf, and transverse rigid clasps having angular ends passed through openings provided therefor in the leaves and disposed on the outer sides of the spring portions.

2. In a device of the character described, a pair of pivotally related comparatively thick leaves carrying integral spring portions of reduced thickness and longitudinally disposed, and rigid clasps secured athwart said leaves through openings formed therein intermediate said spring portions and the outer edges of said leaves.

In testimony whereof I affix my signature in presence of two witnesses.

EDWARD H. ELDER.

Witnesses:
Z. D. B. HALLETT,
L. V. FIFE.

Copies of this patent may be obtained for five cents each, by addressing the "Commissioner of Patents, Washington, D. C."